(12) United States Patent
Kruempelmann et al.

(10) Patent No.: US 11,226,884 B2
(45) Date of Patent: Jan. 18, 2022

(54) DATABASE MONITORING USING SHARED INFRASTRUCTURE

(71) Applicant: SAP SE, Walldorf (DE)

(72) Inventors: Wulf Kruempelmann, Altlussheim (DE); Susanne Schott, Mannheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/885,222

(22) Filed: May 27, 2020

(65) Prior Publication Data

US 2021/0374028 A1    Dec. 2, 2021

(51) Int. Cl.
| G06F 11/00 | (2006.01) |
| G06F 11/30 | (2006.01) |
| G06F 16/2452 | (2019.01) |
| G06F 11/07 | (2006.01) |
| G06F 11/32 | (2006.01) |

(52) U.S. Cl.
CPC ...... *G06F 11/3034* (2013.01); *G06F 11/0772* (2013.01); *G06F 11/327* (2013.01); *G06F 16/2452* (2019.01)

(58) Field of Classification Search
CPC . G06F 11/0772; G06F 11/3034; G06F 11/327
See application file for complete search history.

(56) References Cited

U.S. PATENT DOCUMENTS

| 7,954,014 | B2* | 5/2011 | Wang | G06Q 10/06 |
| | | | | 714/47.1 |
| 9,697,104 | B2* | 7/2017 | Obermiller | G06F 16/25 |
| 9,766,965 | B2* | 9/2017 | Waheed | G06F 11/142 |
| 9,830,470 | B2* | 11/2017 | Kerschbaum | G06F 21/6227 |
| 10,282,113 | B2* | 5/2019 | Prahlad | G06F 3/0605 |
| 10,379,889 | B2* | 8/2019 | Macatangay | G06F 9/45558 |
| 10,491,689 | B2* | 11/2019 | Kuchibhotla | H04L 41/0816 |
| 2013/0198637 | A1* | 8/2013 | Childers, Jr. | H04L 41/5064 |
| | | | | 715/735 |
| 2014/0012988 | A1* | 1/2014 | Kruempelmann | H04L 67/1036 |
| | | | | 709/226 |
| 2014/0047099 | A1* | 2/2014 | Flores | H04L 41/5096 |
| | | | | 709/224 |
| 2017/0371968 | A1* | 12/2017 | Horowitz | H04L 67/1097 |
| 2019/0058639 | A1* | 2/2019 | Rangavajhala | G06F 11/0766 |
| 2019/0095272 | A1* | 3/2019 | Haridas | G06F 11/073 |

* cited by examiner

*Primary Examiner* — Elmira Mehrmanesh
(74) *Attorney, Agent, or Firm* — Mintz Levin Cohn Ferris Glovsky and Popeo, P.C.

(57) ABSTRACT

A method for database monitoring may include sending, to a central database, a query on a database view at the central database. The database view may include a first operational data from a first local database and a second operational data from a second local database. An operational state of the central database may be determined based on the response to the query on the database view. Moreover, in response to receiving, from the central database, a response including the first operational data, a first operational state of the first local database may be determined based on the first operational data. Alternatively and/or additionally, in response to receiving, from the central database, a response including the second operational data, a second operational state of the second local database may be determined based on the second operational data. Related systems and articles of manufacture, including computer program products, are also provided.

20 Claims, 4 Drawing Sheets

| SID | STATUS | DB SIZE | DISK SPACE USAGE | RAM USAGE | ... |
|---|---|---|---|---|---|
| DB 1 | DB_RUNNING | x MB | y % | z % | ... |
| DB 2 | DB_NOT_RUNNING | NA | NA | NA | ... |
| ... | ... | ... | ... | ... | ... |

FIG. 2

DATABASE MONITORING USING SHARED INFRASTRUCTURE

TECHNICAL FIELD

The present disclosure generally relates to database processing and, more specifically, to monitoring distributed databases using shared infrastructure.

BACKGROUND

A software application may be hosted by a cloud-computing platform such that the application may be remotely accessible to multiple tenants over a wired network and/or a wireless network including, for example, a local area network (LAN), a virtual local area network (VLAN), a wide area network (WAN), a public land mobile network (PLMN), the Internet, and/or the like. Many organizations may rely on such cloud-based software applications including, for example, enterprise resource planning (ERP) software, customer relationship management (CRM) software, and/or the like. These cloud-based applications may provide a variety of data processing functionalities including, for example, payroll, time and attendance management, recruiting and onboarding, learning and development, performance and compensation, workforce planning, and/or the like. For example, a cloud-based software application may be available as a cloud-based service including, for example, a software as a service (SaaS) and/or the like. Moreover, the data processing functionalities of a cloud-based software application as well as the corresponding data may be accessed remotely through a native application, a web application, and/or the like.

SUMMARY

Methods, systems, and articles of manufacture, including computer program products, are provided for database monitoring. In one aspect, there is provided a system including at least one processor and at least one memory. The at least one memory can store instructions that cause operations when executed by the at least one processor. The operations may include: sending, to a central database, a query on a database view at the central database, the database view including a first operational data from a first local database coupled with the central database and a second operational data from a second local database coupled with the central database; in response to receiving, from the central database, a response including the first operational data of the first local database, determining, based at least on the first operational data, a first operational state of the first local database; and generating, based at least on the first operational state of the first local database, an alert.

In some variations, one or more of the features disclosed herein including the following features can optionally be included in any feasible combination. A second operational state of the second local database may be determined based at least on the second operational data included in the response from the central database. The alert may be further generated based at least on the second operational state of the second database.

In some variations, in response to the central database failing to respond to the query on the database view, an error may be detected at the central database. The alert may be further generated based at least on the error at the central database.

In some variations, the query may include a structured query language (SQL) select statement selecting, from the database view, the first operational data of the first local database and/or the second operational data of the second local database.

In some variations, the database view may include a union view that includes a first view of the first operational data from the first local database and a second view of the second operational data from the second local database. The central database may respond to the query by at least translating the query into an open data protocol (OData) call to retrieve the first operational data from the first local database and/or the second operational data from the second local database.

In some variations, the first operational data may include an operational status of the first local database. The alert may be generated in response to the operational status of the first local database being not running.

In some variations, the first operational data may include one or more operational metrics at the first local database. The alert may be generated in response to the one or more operational metrics exceeding a threshold value.

In some variations, the one or more operational metrics may include a disk space usage, and/or a random access memory (RAM) usage.

In some variations, the first local database may store a first data associated with a first tenant of a cloud-based software application. The second local database may store a second data associated with a second tenant of the cloud-based software application. The central database may store data that is shared amongst the first tenant and the second tenant.

In another aspect, there is provided a method for database monitoring. The method may include: sending, to a central database, a query on a database view at the central database, the database view including a first operational data from a first local database coupled with the central database and a second operational data from a second local database coupled with the central database; in response to receiving, from the central database, a response including the first operational data of the first local database, determining, based at least on the first operational data, a first operational state of the first local database; and generating, based at least on the first operational state of the first local database, an alert.

In some variations, one or more of the features disclosed herein including the following features can optionally be included in any feasible combination. The method may further include: determining, based at least on the second operational data included in the response from the central database, a second operational state of the second local database; and generating the alert further based at least on the second operational state of the second database.

In some variations, the method may further include: in response to the central database failing to respond to the query on the database view, detecting an error at the central database; and generating the alert further based at least on the error at the central database.

In some variations, the query may include a structured query language (SQL) select statement selecting, from the database view, the first operational data of the first local database and/or the second operational data of the second local database.

In some variations, the database view may include a union view that includes a first view of the first operational data from the first local database and a second view of the second operational data from the second local database. The central database may respond to the query by at least translating the query into an open data protocol (OData) call to retrieve the first operational data from the first local database and/or the second operational data from the second local database.

In some variations, the first operational data may include an operational status of the first local database. The alert may be generated in response to the operational status of the first local database being not running.

In some variations, the first operational data may include one or more operational metrics at the first local database. The alert may be generated in response to the one or more operational metrics exceeding a threshold value.

In some variations, the one or more operational metrics may include a disk space usage, and/or a random access memory (RAM) usage.

In another aspect, there is provided a computer program product that includes a non-transitory computer readable medium. The non-transitory computer readable medium may store instructions that cause operations when executed by at least one data processor. The operations may include: sending, to a central database, a query on a database view at the central database, the database view including a first operational data from a first local database coupled with the central database and a second operational data from a second local database coupled with the central database; in response to receiving, from the central database, a response including the first operational data of the first local database, determining, based at least on the first operational data, a first operational state of the first local database; and generating, based at least on the first operational state of the first local database, an alert.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the monitoring of databases using shared infrastructure, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 depicts an example of a database view, in accordance with some example embodiments;

Figure 1:
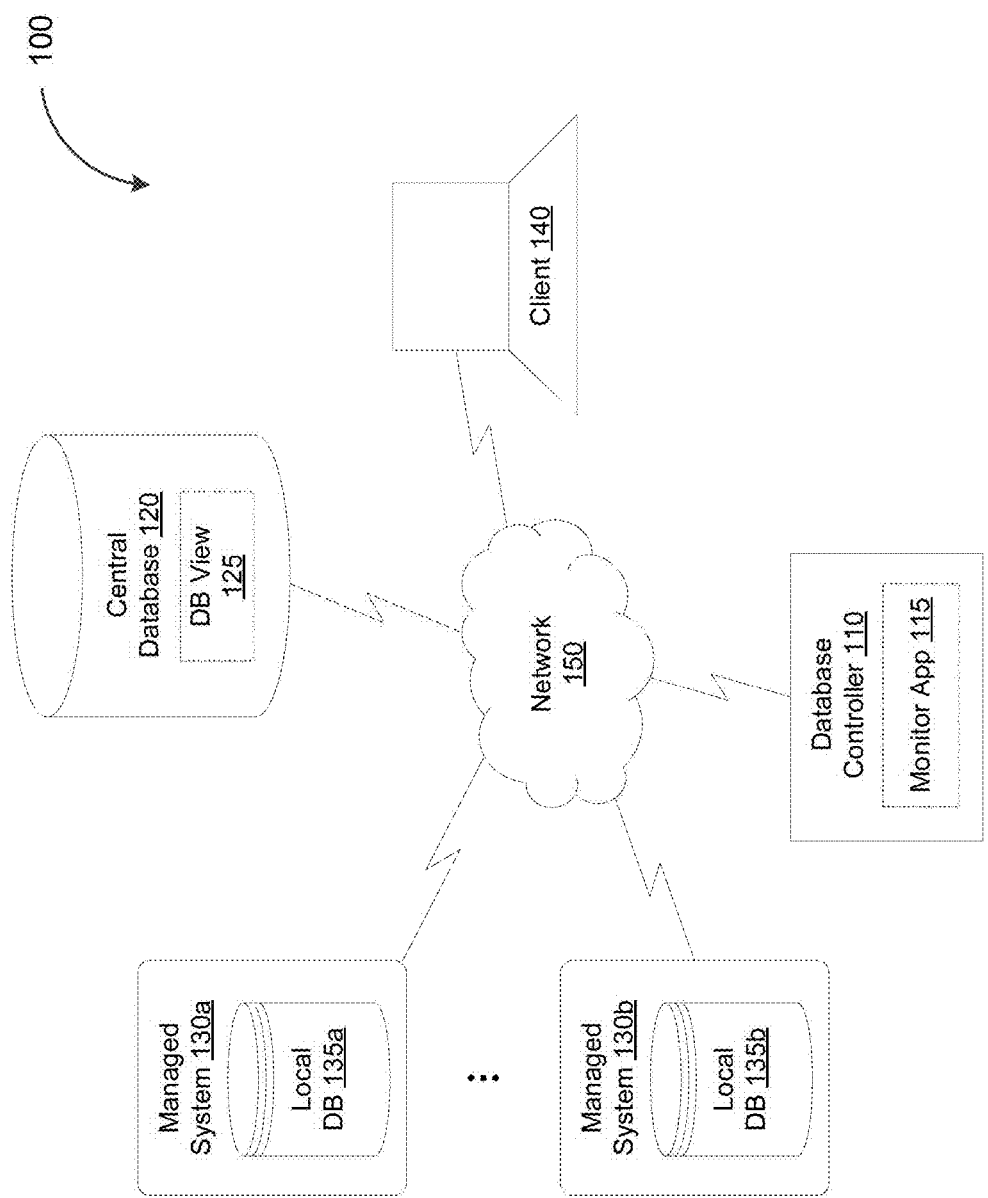
FIG. 1 depicts a system diagram illustrating a database monitoring system, in accordance with some example embodiments.

When practical, like labels are used to refer to same or similar items in the drawings.

DETAILED DESCRIPTION

A cloud-based software application may operate on data stored in one or more databases. Where multiple tenants share access to the same cloud-based software application, the data may include shared data stored in a central database as well as tenant-specific data stored in various local databases coupled to the central database. To ensure that the cloud-based software application operates properly for each tenant may require monitoring of the central database as well as the local databases. For example, each of the local databases may be monitored by evaluating operational data including operational status (e.g., heartbeat) and operational metrics (e.g., database size, disk space usage, random access memory (RAM) usage, and/or the like). However, monitoring each of the local databases individually may impose significant overhead at least because the infrastructure of the local databases may require reconfiguration in order to support the monitoring. As such, in some example embodiments, the central database may be configured to provide a shared infrastructure for monitoring the operations of the local databases coupled with the central database. For instance, a database view may be defined at the central database to enable the collection and analysis of operational data from each of the local databases coupled with the central database.

In some example embodiments, a database controller may monitor the local databases by at least querying the database view, which may be defined as a union view that includes view of operational data (e.g., operational status, operational metrics, and/or the like) from each local database coupled with the central database. In response to the database controller querying the database view, the database view may be updated with operational data retrieved from one or more of the local databases. For example, the query on the database view may be transformed into a request, for example, an open data protocol (OData) call and/or the like, to retrieve the operational data from one or more local databases. The database controller may determine, based at least on the operational data included in the database view, the operational states of the local databases coupled with the central database. For instance, the database controller may determine, based at least on the operational status of a local database, whether the local database is operational. Alternatively and/or additionally, the database controller may determine, based at least on the operational metrics of the local database, whether the local database is operating normally.

FIG. 1 depicts a system diagram illustrating a database monitoring system 100, in accordance with some example embodiments. Referring to FIG. 1, the database monitoring system 100 may include a database controller 110, a central database 120, a first managed system 130a having a first local database 135a, a second managed system 130b having a second local database 135b, and a client 140. As shown in FIG. 1, the database controller 110, the central database 120, the first managed system 130a, the second managed system 130b, and the client 140 may be communicatively coupled via a network 150. The network 160 may be a wired network and/or a wireless network including, for example, a wide area network (WAN), local area network (LAN), a virtual local area network (VLAN), the Internet, and/or the like.

Referring again to FIG. 1, a cloud-based software application may operate on data stored in multiple databases. The cloud-based software application may be an enterprise resource planning (ERP) software application, a customer relationship management (CRM) software application, a supply chain management (SCM) software application, and/or the like. Accordingly, the cloud-based software application may provide a variety of data processing functionalities including, for example, procurement, payroll, time and attendance management, recruiting and onboarding, learning and development, performance and compensation, workforce planning, and/or the like. Where multiple tenants share access to the same cloud-based software application, the data may include shared data stored in the central database 120 as well as tenant-specific data stored in various local databases coupled to the central database 120 including, for example, the first local database 135a at the first managed system 130a, the second local database 135b at the second managed system 130b, and/or the like.

To ensure that the cloud-based software application operates properly for each tenant, the database controller 110, for example, a monitor application 115 at the database controller 110, may be configured to monitor the central database 120 as well as the first local database 135a at the first managed system 130a and the second local database 135b at the second managed system 130b. For example, the database controller 110 may monitor each of the first local database 135a and the second local database 135b by evaluating operational data that includes operational status (e.g., heartbeat) and operational metrics (e.g., database size, disk space usage, random access memory usage, and/or the like). In some example embodiments, the database controller 110 may monitor each of the first local database 135a and the second local database 135b without reconfiguring the infrastructure at the first local database 135a or the second local database 135b. Instead, a database view 125 may be defined at the central database 120 to enable the collection of operational data from each of the first local database 135a and the second local database 135b. As used herein, a "database view" may refer to the results of a predefined query. Accordingly, the database view 125 may provide a virtual view of operational data residing at remote systems including, for example, the first local database 135a at the first managed system 130a and the second local database 135b at the second managed system 130b.

In some example embodiments, the database view 125 may be defined as a union view that includes a first view of operational data from the first local database 135a and a second view of operational data from the second local database 135b. As such, the database controller 110 may monitor each of the first local database 135a and the second local database 135b by at least querying the database view 125. In response to the database controller 110 querying the database view 125, the database view 125 may be updated with operational data retrieved from the first local database 135a and/or the second local database 135b. For example, the query on the database view 125 may be translated into a request, for example, an open data protocol (OData) call and/or the like, to retrieve the operational data from each of the first local database 135a and the second local database 135b.

The database controller 110 may determine, based at least on the operational data included in the database view 125, the operational status of the first local database 135a as well as the second local database 135b. For example, the database controller 110 may determine, based at least on the operational status of the first local database 135a, whether the first local database 135a is running. Alternatively and/or additionally, the database controller 110 may determine, based at least on the operational metrics of the first local database 135a, whether the first local database 135a is operating normally. Examples of operational metrics may include database size, disk space usage, random access memory (RAM) usage, and/or the like. The database controller 110 may determine that the first local database 135a is operating abnormally if, for example, one or more operational metrics at the first local database 135a exceeds a threshold value.

Figure 2:
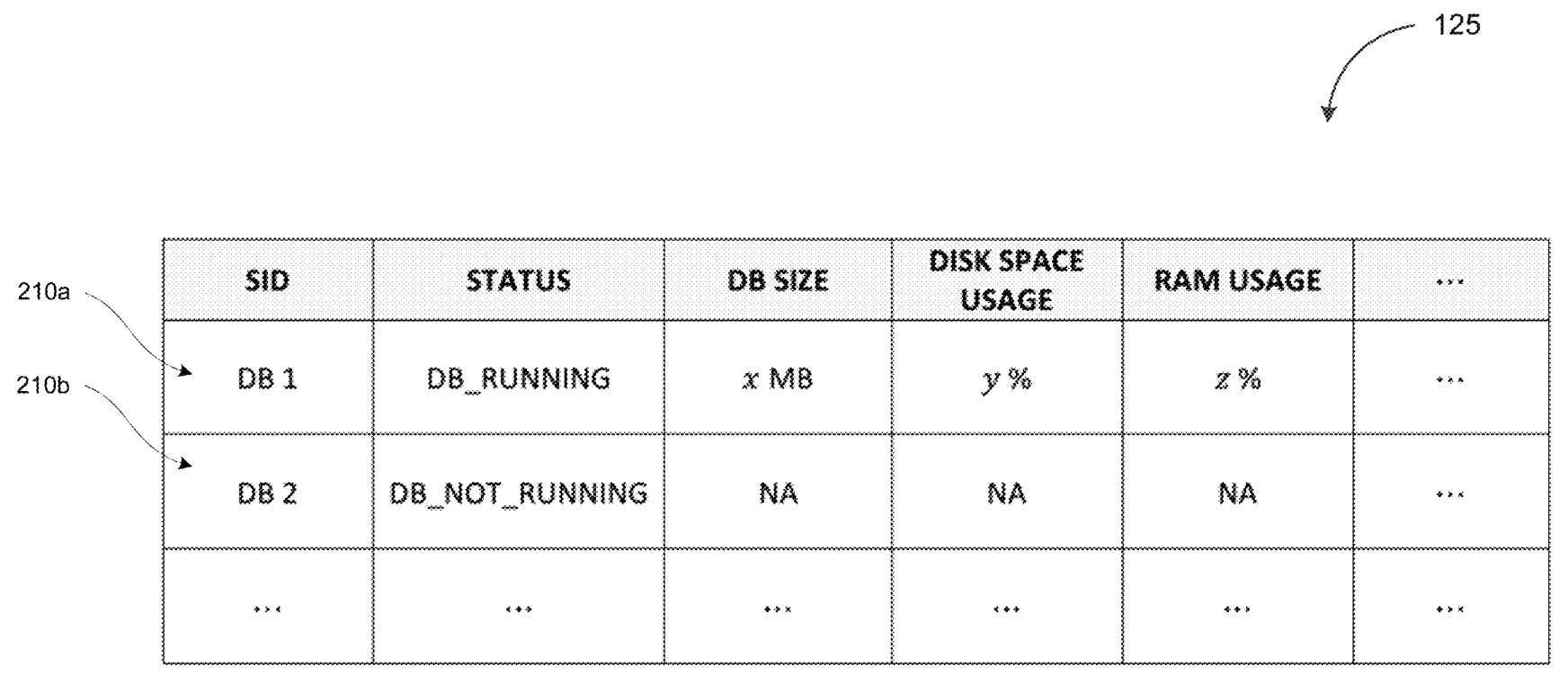

FIG. 2 depicts an example of the database view 125, consistent with implementations of the current subject matter. Referring to FIG. 2, the database view 125 may be defined to include operational data from multiple local databases including, for example, the first local database 135a, the second local database 135b, and/or the like. The database view 125 may provide a virtual view of operational data residing at various remote systems including, for example, the first local database 135a at the first managed system 130a and the second local database 135b at the second managed system 130b. Moreover, as shown in FIG. 2, the database view 125 may be a union view of a first view 210a of operational data from the first local database 135a and a second view 210b of operational data from the second local database 135b.

In some example embodiments, the database view 125 may be updated in response to the database controller 110 querying the database view 125. For example, the database controller 110 may send, to the central database 120, a structured query language (SQL) statement (e.g., a SQL select statement and/or the like) selecting, from the database view 125, operational data associated with the first local database 135a and/or the second local database 135b. In response to receiving the query from the database controller 110, the central database 120 may translate the query (e.g., the SQL select statement) into a request, for example, an open data protocol (OData) call and/or the like, to retrieve operational data from the first local database 135a and/or the second local database 135b.

In some example embodiments, the database controller 110 may determine, based the response to the query sent to the central database 120, an operational status of the central database 120. For example, the database controller 110 may determine that the central database 120 is operating normally if the central database 120 responds to the query from the database controller 110 by at least sending, to the database controller 110, the selected operational data associated with the first local database 135a and/or the second local database 135b. Alternatively, the database controller 110 may determine that an error has occurred at the central database 120 if the central database 120 fails to respond to the query from the database controller 110. In response to determining that an error has occurred at the central database 120, the database controller 110 may send, to the client 140, an alert indicating that an error has occurred at the central database 120.

Moreover, the database controller 110 may determine, based at least on the operational data included in the database view 125, the operational states of the first local database 135a and/or the second local database 135b. For example, as shown in FIG. 2, the database view 125 may include an operational status for each of the first local database 135a and the second local database 135b. The operational status of the first local database 135a and the second local database 135b may correspond to a result of a heartbeat check performed at each of the first local database 135a and the second local database 135b. Accordingly, in response to the database controller 110 querying the database view 125, the operational status of the first local database 135a and the second local database 135b included in the database view 125 may be updated based on the responses to the requests (e.g., the open data protocol (OData) requests and/or the like) to retrieve operational data from each of the first local database 135a and the second local database 135b.

For instance, in the example of the database view 125 shown in FIG. 2, the operational status for the first local database 135a may be "DB_RUNNING" if the first local database 135a responds to the request (e.g., the open data protocol (OData) call and/or the like) to retrieve operational data from the first local database 135a. Alternatively, the operational status of the second local database 135b may be "DB_NOT_RUNNING" if the second local database 135b fails to respond to the request (e.g., the open data protocol (OData) call and/or the like) to retrieve operational data from the second local database 135b. In response to the operational status of the second local database 135b being "DB_NOT_RUNNING," the database controller 110 may send, to the client 140, an alert indicating that the second local database 135b is not running.

In some example embodiments, FIG. 2 shows that the database view 125 may further include one or more operational metrics for each of the first local database 135a and the second local database 135b. For example, the first local database 135a may respond to the query from the central database 120 to retrieve operational data from the first local database 135a. Accordingly, in addition to updating the database view 125 to indicate that the operational status of the first local database 135a is "DB RUNNING," the database view 125 may be updated to include one or more operational metrics associated with the first local database 135a including, for example, a database size, a disk space usage, and a random access memory (RAM) usage of the first local database 135a. The database controller 110 may determine, based at least on the operational metrics associated with the first local database 135a, whether the first local database 135a is operating normally. For instance, the database controller 110 may detect one or more operational abnormalities at the first local database 135a if the database size, the disk space usage, and/or the random access memory (RAM) usage of the first local database 135a exceed a threshold value. The database controller 110 may send, to the client 140, an alert indicating that one or more operational abnormalities are occurring at the first local database 135a.

Figure 3:
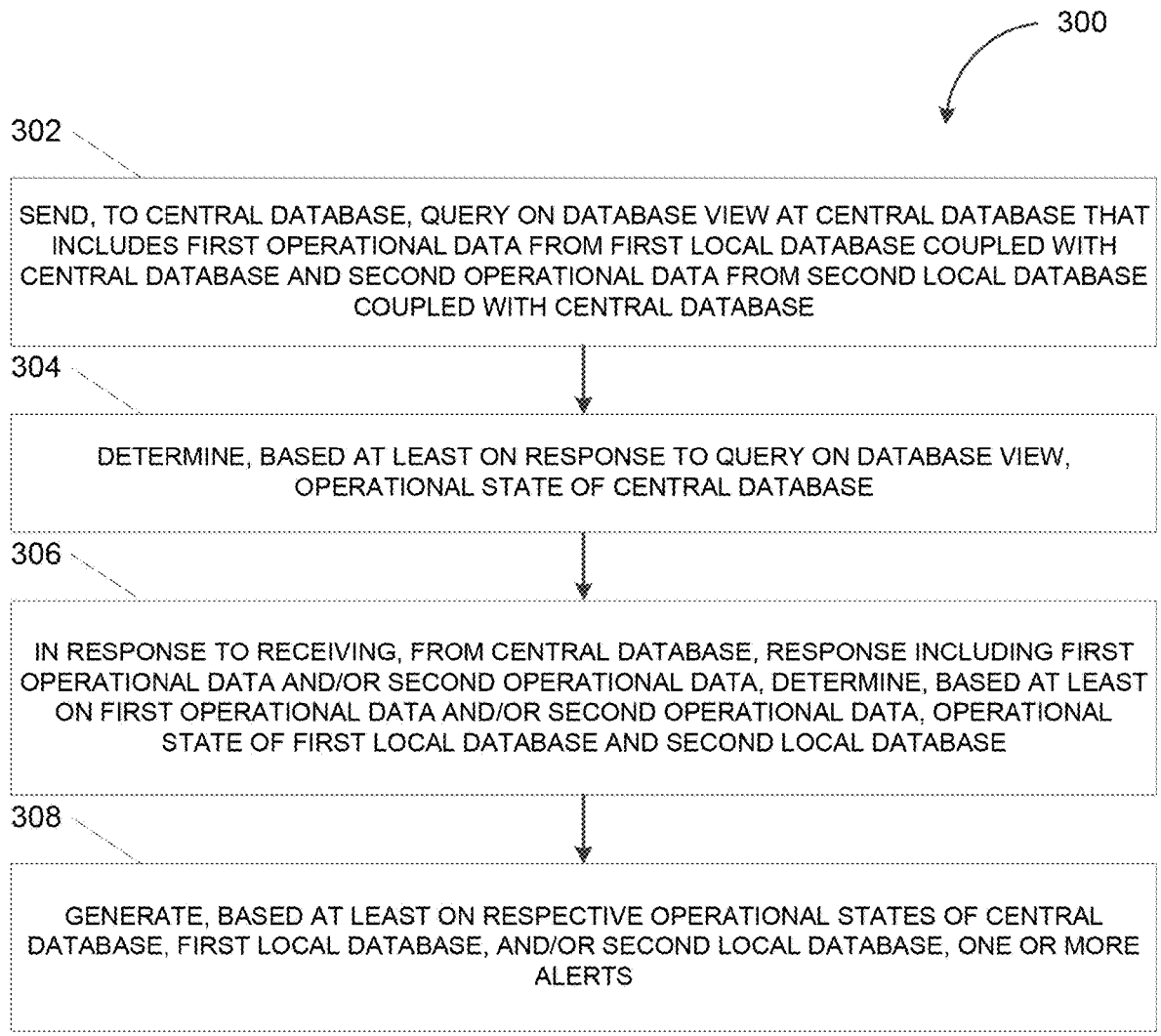
FIG. 3 depicts a flowchart illustrating an example of a process for database monitoring, in accordance with some example embodiments.

FIG. 3 depicts a flowchart illustrating a process 300 for database monitoring, in accordance with some example embodiments. Referring to FIGS. 1-3, the process 300 may be performed by the database controller 110 to monitor the central database 120 as well as the first local database 135a at the first managed system 130a and the second local database 135b at the second managed system 130b.

At 302, the database controller 110 may send, to the central database 120, a query on a database view at the central database 120 that includes a first operational data from the first local database 135a coupled with the central database 120 and a second operational data the second local database 135b coupled with the central database 120. In some example embodiments, where multiple tenants share access to the same cloud-based software application, the data associated with the cloud-based software application may include shared data stored in the central database 120 as well as tenant-specific data stored in various local databases coupled to the central database 120 including, for example, the first local database 135a at the first managed system 130a, the second local database 135b at the second managed system 130b, and/or the like. To obviate separate infrastructure for monitoring each of the first local database 135a and the second local database 135b, the database view 125 may be defined at the central database 120. The database view 125 may provide a virtual view of operational data residing at remote systems including, for example, the first local database 135a at the first managed system 130a and the second local database 135b at the second managed system 130b. Moreover, the database view 125 may be defined as a union view that includes a first view of operational data from the first local database 135a and a second view of operational data from the second local database 135b.

To monitor the status of the central database 120 as well as each of the first local database 135a and the second local database 135b, the database controller 110 may query the database view 125 including by sending, to the central database 110, a SQL select statement selecting, from the database view 125, operational data associated with the first local database 135a and/or the second local database 135b. In response to receiving the SQL select statement from the database controller 110, the central database 120 may translate the SQL select statement into a request, for example, an open data protocol (OData) call and/or the like, to retrieve operational data from the first local database 135a and/or the second local database 135b.

At 304, the database controller 110 may determine, based at least on a response to the query on the database view, an operational state of the central database 120. For example, the database controller 110 may determine that the central database 120 is operating normally if the central database 120 responds to the query from the database controller 110 by at least sending, to the database controller 110, the selected operational data. Alternatively, the database controller 110 may determine that an error has occurred at the central database 120 if the central database 120 fails to respond to the query from the database controller 110.

At 306, in response to receiving, from the central database 110, a response including the first operational data and/or the second operational data, the database controller 110 may determine, based at least on the first operational data and/or the second operational data, an operational state of the first local database 135a and/or the second local database 135b. In some example embodiments, in response to the database controller 110 querying the database view 125, the operational status of the first local database 135a and the second local database 135b included in the database view 125 may be updated based on the responses to the requests (e.g., the open data protocol (OData) requests and/or the like) to retrieve operational data from each of the first local database 135a and the second local database 135b. For instance, as shown in FIG. 2, the operational status for the first local database 135a included in the database view 125 may be "DB_RUNNING" if the first local database 135a responds to the request (e.g., the open data protocol (OData) call and/or the like) to retrieve operational data from the first local database 135a. Alternatively, the operational status of the second local database 135b included in the database view 125 may be "DB_NOT_RUNNING" if the second local database 135b fails to respond to the request (e.g., the open data protocol (OData) call and/or the like) to retrieve operational data from the second local database 135b. The database controller 110 may determine, based at least on the respective operational status of the first local database 135a and the second local database 135b, whether the first local database 135a and the second local database 135b are running.

In some example embodiments, in response to the database controller 110 querying the database view 125, the database view 125 may be further updated to include one or more operational metrics associated with the first local database 135a and/or the second local database 135b including, for example, a database size, a disk space usage, a random access memory (RAM) usage, and/or the like. The database controller 110 may determine, based at least on the operational metrics associated with each of the first local database 135a and the second local database 135b, whether the first local database 135a and the second local database 135b are operating normally. For example, the database controller 110 may detect one or more operational abnormalities at the first local database 135a if the database size, the disk space usage, and/or the random access memory (RAM) usage of the first local database 135a exceed a threshold value.

At 308, the database controller 110 may generate, based at least on the respective operational states of the central database 120, the first local database 135a, and/or the second local database 135b, one or more alerts. For example, in response to the central database 120 failing to respond to the query (e.g., SQL select statement) on the database view 125, the database controller 110 may send, to the client 140, an alert indicating that an error has occurred at the central database 120. Alternatively and/or additionally, the database controller 110 may determine that the first local database 135a and/or the second local database 135b are not running or that the first local database 135a and/or the second local database 135b are operating abnormally. Accordingly, the database controller 110 may send, to the client 140, one or more alerts indicative of an error at the first local database 135a and/or the second local database 135b. The alert may trigger one or more corrective actions including, for example, the activation of a backup database.

Figure 4:
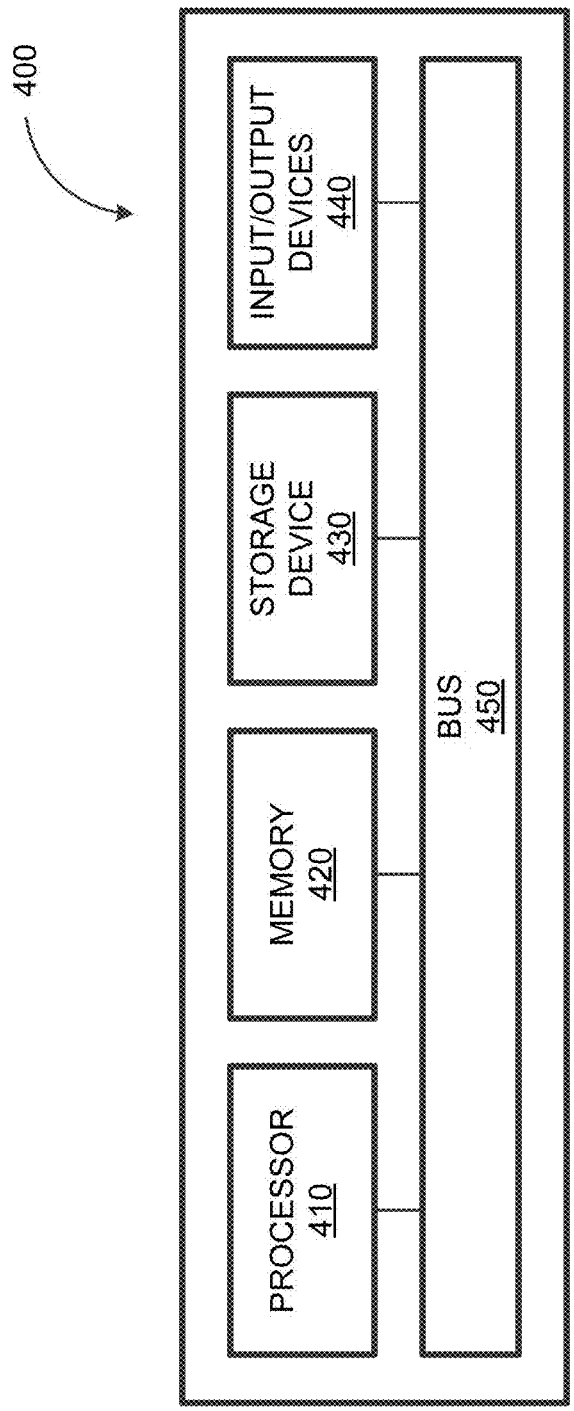
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1-4, the computing system 400 can be used to implement the database controller 110 and/or any components therein.

As shown in FIG. 4, the computing system 400 can include a processor 410, a memory 420, a storage device 430, and input/output device 440. The processor 410, the memory 420, the storage device 430, and the input/output device 440 can be interconnected via a system bus 440. The processor 410 is capable of processing instructions for execution within the computing system 400. Such executed instructions can implement one or more components of, for example, the database controller 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
at least one data processor; and
at least one memory storing instructions, which when executed by the at least one data processor, result in operations comprising:
   sending, to a central database, a query on a database view at the central database, the database view comprising a result of a predefined query that includes a first operational data from a first local database coupled with the central database and a second operational data from a second local database coupled with the central database;
   in response to receiving, from the central database, a response including the first operational data of the first local database, determining, based at least on the first operational data, a first operational state of the first local database; and
   generating, based at least on the first operational state of the first local database, an alert.

2. The system of claim 1, further comprising:
determining, based at least on the second operational data included in the response from the central database, a second operational state of the second local database; and
generating the alert further based at least on the second operational state of the second database.

3. The system of claim 1, further comprising:
in response to the central database failing to respond to the query on the database view, detecting an error at the central database; and
generating the alert further based at least on the error at the central database.

4. The system of claim 1, wherein the query comprises a structured query language (SQL) select statement selecting, from the database view, the first operational data of the first local database and/or the second operational data of the second local database.

5. The system of claim 1, wherein the database view comprises a union view that includes a first view of the first operational data from the first local database and a second view of the second operational data from the second local database.

6. The system or claim 5, wherein the central database responds to the query by at least translating the query into an open data protocol (OData) call to retrieve the first operational data from the first local database and/or the second operational data from the second local database.

7. The system of claim 1, wherein the first operational data includes an operational status of the first local database, and wherein the alert is generated in response to the operational status of the first local database being not running.

8. The system of claim 1, wherein the first operational data includes one or more operational metrics at the first local database, and wherein the alert is generated in response to the one or more operational metrics exceeding a threshold value.

9. The system of claim 8, wherein the one or more operational metrics include a disk space usage, and/or a random access memory (RAM) usage.

10. The system of claim 1, wherein the first local database stores a first data associated with a first tenant of a cloud-based software application, wherein the second local database stores a second data associated with a second tenant of the cloud-based software application, and wherein the central database stores data that is shared amongst the first tenant and the second tenant.

11. A computer-implemented method, comprising:
sending, to a central database, a query on a database view at the central database, the database view comprising a result of a predefined query that includes a first operational data from a first local database coupled with the central database and a second operational data from a second local database coupled with the central database;
in response to receiving, from the central database, a response including the first operational data of the first local database, determining, based at least on the first operational data, a first operational state of the first local database; and
generating, based at least on the first operational state of the first local database, an alert.

12. The method of claim 11, further comprising:
determining, based at least on the second operational data included in the response from the central database, a second operational state of the second local database; and
generating the alert further based at least on the second operational state of the second database.

13. The method of claim 11, further comprising:
in response to the central database failing to respond to the query on the database view, detecting an error at the central database; and
generating the alert further based at least on the error at the central database.

14. The method of claim 11, wherein the query comprises a structured query language (SQL) select statement selecting, from the database view, the first operational data of the first local database and/or the second operational data of the second local database.

15. The method of claim 11, wherein the database view comprises a union view that includes a first view of the first operational data from the first local database and a second view of the second operational data from the second local database.

16. The method or claim 15, wherein the central database responds to the query by at least translating the query into an open data protocol (OData) call to retrieve the first operational data from the first local database and/or the second operational data from the second local database.

17. The method of claim 11, wherein the first operational data includes an operational status of the first local database, and wherein the alert is generated in response to the operational status of the first local database being not running.

18. The method of claim 11, wherein the first operational data includes one or more operational metrics at the first local database, and wherein the alert is generated in response to the one or more operational metrics exceeding a threshold value.

19. The method of claim 18, wherein the one or more operational metrics include a disk space usage, and/or a random access memory (RAM) usage.

20. A non-transitory computer readable medium storing instructions, which when executed by at least one data processor, result in operations comprising:
sending, to a central database, a query on a database view at the central database, the database view comprising a result of a predefined query that includes a first operational data from a first local database coupled with the central database and a second operational data from a second local database coupled with the central database;
in response to receiving, from the central database, a response including the first operational data of the first local database, determining, based at least on the first operational data, a first operational state of the first local database; and
generating, based at least on the first operational state of the first local database, an alert.

* * * * *